US006846563B2

(12) United States Patent
Moireau

(10) Patent No.: US 6,846,563 B2
(45) Date of Patent: Jan. 25, 2005

(54) SIZING COMPOSITION FOR GLASS YARNS, METHOD USING SAID COMPOSITION AND RESULTING PRODUCTS

(75) Inventor: Patrick Moireau, Curienne (FR)

(73) Assignee: Saint-Gobain Vetrotex France S.A., Chambery (FR)

( * ) Notice: Subject to any disclaimer, the term of this patent is extended or adjusted under 35 U.S.C. 154(b) by 94 days.

(21) Appl. No.: 10/276,698

(22) PCT Filed: May 16, 2001

(86) PCT No.: PCT/FR01/01488

§ 371 (c)(1),
(2), (4) Date: Nov. 18, 2002

(87) PCT Pub. No.: WO01/87792

PCT Pub. Date: Nov. 22, 2001

(65) Prior Publication Data

US 2003/0194553 A1 Oct. 16, 2003

(30) Foreign Application Priority Data

May 17, 2000 (FR) .............................. 00 06266

(51) Int. Cl.[7] .............................. D02G 3/00; B05D 3/02; A62D 1/00
(52) U.S. Cl. ..................... 428/378; 428/375; 428/392; 427/385.5; 427/389.7; 264/211.12; 252/8.83; 252/8.81
(58) Field of Search ................... 428/375, 378, 428/381, 382, 384, 391, 392; 427/389.7, 385.5, 178; 264/211.12; 65/381, 382, 384; 252/8.83, 8.81

(56) References Cited

U.S. PATENT DOCUMENTS

| 4,988,461 | A | 1/1991 | Nichols |
| 5,486,416 | A | 1/1996 | Johnson et al. |
| 5,556,045 | A | 9/1996 | Johnson et al. |
| 5,601,882 | A | 2/1997 | Augier et al. |
| 5,611,836 | A | 3/1997 | Moireau |
| 5,698,000 | A | 12/1997 | Moireau et al. |
| 5,882,792 | A | 3/1999 | Moireau |
| 5,955,195 | A | 9/1999 | Moireau |
| 5,972,504 | A | 10/1999 | Moireau et al. |
| 5,985,447 | A | 11/1999 | Moireau |
| 5,989,711 | A | 11/1999 | Moireau et al. |
| 6,090,487 | A | 7/2000 | Moireau |
| 6,187,435 | B1 | 2/2001 | Moireau et al. |
| 6,316,058 | B1 | 11/2001 | Moireau et al. |
| 6,322,888 | B1 | 11/2001 | Moireau et al. |
| 6,514,612 | B1 | 2/2003 | Moireau et al. |
| 2003/0194553 | A1 * | 10/2003 | Moireau ................... 428/375 |

FOREIGN PATENT DOCUMENTS

| FR | 2 772 369 | 6/1999 |
| JP | 05 330860 | 12/1993 |

OTHER PUBLICATIONS

"Glass fiber coating composition" Research Disclosure, No. 367, p. 606 Nov. 1, 1994.
Yamamura Shigekazu et al.: "Binder for glass fibers" Chemical Abstracts + Indexes, US, Americal Chemical Society, vol. 110, nr. 9, p. 319.

* cited by examiner

*Primary Examiner*—Rena Dye
*Assistant Examiner*—J. M. Gray
(74) *Attorney, Agent, or Firm*—Oblon, Spivak, McClelland, Maier & Neustadt, P.C.

(57) ABSTRACT

A sizing composition which is useful for coating glass strands contains a solution having a solvent content of less than 5% by weight. The solution contains at least 45% by weight of components capable of curing. At least 40% of the components capable of curing have a molecular mass of between 750 and 5000. The components capable of curing contain at least one mixture containing a) one or more components having at least one acrylic reactive functional group and/or methacrylic reactive functional group, and b) one or more components having at least one primary amine reactive functional group and/or secondary amine reactive functional group.

20 Claims, No Drawings

SIZING COMPOSITION FOR GLASS YARNS, METHOD USING SAID COMPOSITION AND RESULTING PRODUCTS

The present invention relates to the field of reinforcing fibers, especially for the production of composites. It relates to a sizing composition for glass strands, to a process for preparing said strands using this composition and to the glass strands obtained and the composites produced from these strands.

It is known to manufacture glass reinforcing strands from streams of molten glass flowing out of the orifices of bushings. These streams are drawn in the form of continuous filaments, then these filaments are assembled into base strands, which are then collected.

Before they are assembled in the form of strands, the filaments are usually coated with a size or sizing composition by passing them through a sizer. This deposition of size is very important as it makes it possible, on the one hand, to obtain the strands and, on the other hand, to use these strands effectively in making up composites. The size has the following usual functions: it protects the strands from abrasion, thus preventing them from breaking during their manufacture and possibly during their use; it allows the strands thus formed to be combined with organic and/or inorganic materials to be reinforced, especially making it easier for the strands to be wetted by and impregnated with these materials.

In general, the size thus favors adhesion between the glass and the material to be reinforced, thereby making it possible to obtain composites having improved mechanical properties.

The size may also ensure integrity of the strands, that is to say may allow the filaments to be linked together within the strands. This integrity is desired especially in applications in which the strands are subjected to high mechanical stresses, such as textile applications. This is because filaments that are not strongly attached to each other have a tendency to break, which disrupts the proper functioning of the textile machines.

Furthermore, strands with no integrity are known to be difficult to handle.

In general, the sizing compositions must also be able to withstand the shear induced by passage of the strands over the drawing devices and to wet the surface of the filaments, and to do so at high drawing speeds of the order of several tens of meters per second.

Moreover, it is recommended to choose sizing compositions from those which preserve their initial properties over time.

These compositions must not be able to react at the storage temperature (in general below 30° C.) or even at a higher temperature such as that which may be encountered beneath the bushing (of around 80–100° C.), as then the increase in the viscosity is such that it is difficult, or even impossible, to deposit the size on the filaments.

The sizes most commonly employed are low-viscosity aqueous sizes which are easy to use but must be deposited in large amounts on the filaments. Water generally represents more than 80% by weight of the size, which requires the strands to be dried before they are used, since the water may cause, among other things, a reduction in the adhesion between the strands and the material to be reinforced. Drying by heat treatment is a lengthy and expensive operation which needs to be perfectly matched to the strand manufacturing conditions. Such a treatment is not neutral with regard to the sized strand. When the sized strand is especially wound in the form of packages, the following may occur: modification in the distribution of the constituents of the size by irregular and/or selective migration, coloration of the size and deformation of the package. The deformation is also observed, in the absence of drying, on straight-sided packages (or rovings) of fine strands (linear density or strand count of less than 600 tex (g/km)) coated with an aqueous size.

To solve the aforementioned problems, so-called anhydrous sizing compositions have been proposed, that is to say those which comprise less than 5% by weight of solvent. Such compositions are described, for example, in the following patent applications:

FR-A-2 727 972 proposes a composition for the size of glass strands which cures by UV radiation or an electron beam. This composition has a viscosity of less than or equal to 400 cP and comprises a curable base system which contains at least one component with a molecular mass of less than 750 having at least one epoxy functional group and comprising at least 60% by weight of one or more components with a molecular mass of less than 750 having at least one epoxy, hydroxyl, vinyl ether, acrylic or methacrylic functional group.

FR-A-2 772 369 describes a sizing composition for glass strands, which does not require a drying step after deposition on the strand. This composition comprises at least 60% by weight of components capable of curing, these components being, in respect of least 60% of them, components with a molecular mass of less than 750 and these curable components comprising at least one mixture of component(s) having at least one acrylic and/or methacrylic reactive functional group and component(s) having at least one primary amine and/or secondary amine functional group, at least 20% by weight of these components having at least two acrylic, methacrylic, primary amine and/or secondary amine reactive functional groups.

The anhydrous compositions that have just been mentioned contain a high proportion of monomers capable of polymerizing at room temperature. Given that very little time, in general less than 1 second, elapses between deposition of the composition on the glass filaments and winding of the strand, the turns of the package are generally coated with an incompletely cured size. Under the conditions in which the strand is wound directly to form a straight-sided package (rovings), the curing rate is insufficient to allow effective blocking of the first layers of strand. As the following layers are built up, the lower layers have a tendency to collapse, thus modifying the dimensional characteristics of the package during winding. The observed defects (deformation, increase in length, etc.) make such packages unusable on the appropriate devices.

Under the conditions that have just been mentioned, the sizing composition must be able to be deposited on the filaments in the liquid state and rapidly change to a gelled state while the strand is being wound. The time needed to reach the gelled state ("gel time") depends on the temperature at the time of deposition, which temperature may be above 100° C. In general, a sizing composition is satisfactory when its gel time measured at room temperature (around 25° C.) is between 10 and 40 minutes, preferably between 15 and 30 minutes.

Moreover, at the deposition temperature, which may be above 100° C. as mentioned above, the monomers present in the sizing composition have a tendency to evaporate because of their relatively high vapor pressure. This results in a reduction in the content of monomers in the composition and therefore in a variation in the amount and the composition of the size along the strand. Furthermore, the volatile compounds and certain monomers, especially the amine monomers, are liable to present a risk to the health of those handling them.

The subject of the present invention is a novel sizing composition capable of coating glass strands reliably, rapidly and uniformly over their entire length and resulting in correct packages on suitable supports, this composition making the strands easy to handle and giving them pliancy compatible with the subsequent treatments, while preserving their integrity.

Another subject of the invention is the glass strands sized by means of the composition defined in the above paragraph, said strands having mechanical properties that are constant over their entire length and being able to reinforce an organic and/or inorganic material in order to prepare compositions, in particular hollow bodies by winding, fabrics for vehicles and wall reinforcement meshes.

The sizing composition according to the invention consists of a solution whose solvent content is less than 5% by weight, this solution comprising at least 45% by weight of components capable of curing, these curable components being, in respect of at least 40% of them, components with a molecular mass of between 750 and 5000 and these curable components comprising at least one mixture capable of curing one or more components having at least one acrylic and/or methacrylic reactive functional group and one or more components having at least one primary and/or secondary amine reactive functional group.

In general, and preferably, at least 40% of the curable components having at least two reactive functional groups chosen from acrylic, methacrylic, primary amine and secondary amine functional groups.

In the present invention, the following expressions have the following meanings:

"solvent" is understood to mean water and organic solvents capable of being used to dissolve certain curable components. The presence of one or more solvents in a limited amount does not require particular treatment in order to remove them. In most cases, the sizes according to the invention are completely stripped of solvent;

"cure", "curable", "curing", etc. are understood to mean "cure and/or crosslink", "curable and/or crosslinkable", "curing and/or crosslinking", etc., respectively;

"reactive functional group" is understood to mean a functional group capable of acting in the reaction of curing the size, the curing possibly taking place at room temperature or at a higher temperature (thermal curing); and "curable components" are understood to mean the indispensable components which allow the expected cured structure of the size to be obtained.

In the rest of the text, "(meth)acrylic component" and "primary and/or secondary amine component" denote, respectively, a "component having at least one acrylic reactive functional group and/or at least one methacrylic reactive functional group" and a "component having at least one primary amine reactive functional group and/or at least one secondary amine reactive functional group".

In the sizing composition according to the invention, the curable components represent between 40 and 100% by weight of the composition, mainly between 45 and 80%, and in most cases between 50 and 70%, by weight. The combination of these curable components is referred to hereafter as the "base system".

Preferably, the base system consists predominantly (that is to say with more than 50%, preferably at least 75% and up to 100% by weight) in most cases of one or more (meth)acrylic components and of one or more primary and/or secondary amine components, the use of this mixture of components making it possible to obtain, after curing, copolymers contributing appreciably to the structure of the cured size.

Furthermore, the base system comprises at least 40% (preferably at least 45% and up to 85% by weight) of component(s) with a molecular mass of between 750 and 5000. In particular, at least 40%, preferably at least 50% and up to 95% by weight of (meth)acrylic component(s) and primary and/or secondary amine component(s) have a mass of between 750 and 5000.

It should be pointed out that, in the definition of the invention, the various contents are evaluated independently of one another, the same component possibly occurring with several contents.

Preferably and in general according to the invention, the aforementioned components with a molecular mass of between 750 and 5000 have a molecular mass of less than 3000. Likewise, in most cases according to the invention, and preferably, these components are monofunctional or polyfunctional polymers, as explained below.

In certain embodiments, the base system according to the invention may optionally comprise up to 60% of component(s) having a molecular mass of less than or equal to 750, and preferably 15 to 50% by weight of said composition.

The curable components of the composition according to the invention may have one or more reactive functional groups. The term "polyfunctional" is defined below as any component having at least two reactive functional groups. Thus, the expression "(meth)acrylic and/or primary and/or secondary amine polyfunctional component" is understood to mean a "component having at least two reactive functional groups chosen from acrylic, methacrylic, primary amine and/or secondary amine functional groups".

According to the invention, the base system comprises at least 40% of (meth)acrylic and/or primary and/or secondary amine polyfunctional components. Preferably, it comprises between 40 and 100% by weight of this (these) component(s), and better still 50 to 80%, these components being preferably chosen from: components having at least two acrylic reactive functional groups, components having at least two methacrylic reactive functional groups, components having at least two primary or secondary amine reactive functional groups, components having at least one acrylic reactive functional group and at least one methacrylic reactive functional group, and components having at least one primary amine reactive functional group and at least one secondary amine reactive functional group.

According to the preferred embodiment of the invention, the base system comprises at least one (meth)acrylic polyfunctional component with a molecular mass of between 750 and 5000 and at least one primary amine and/or secondary amine polyfunctional component.

Preferably, the base system comprises at least one (meth)acrylic polyfunctional component. In the advantageous embodiments of the invention, the content of (meth)acrylic polyfunctional component(s) is at least 20% of the base system, and preferably between 30 and 70%.

Particularly preferably, the base system comprises at least one (meth)acrylic polyfunctional component with a molecular mass of between 750 and 5000. In the particularly preferred embodiments of the invention, at least 20%, preferably 30 to 70%, by weight of the components of the base system are (meth)acrylic polyfunctional components having a molecular mass of between 750 and 5000.

As nonlimiting examples, the (meth)acrylic component of the composition may be chosen from aliphatic or cycloaliphatic long-chain alkyl (meth)acrylates, aromatic (meth)acrylates, products resulting from the esterification of (meth)acrylic acid and a long-chain amino alcohol, products resulting from the reaction of (meth)acrylic acid and a polyalkylene glycol, products resulting from the reaction of (meth)acrylic acid and a polyether-type alcohol, especially a polyether polyol, products resulting from the reaction of (meth)acrylic acid and a polyester-type alcohol, especially a polyester polyol, products resulting from the reaction of (meth)acrylic acid and a product from the reaction of at least one aromatic isocyanate and at least one polyol, and mixtures of these (meth)acrylates.

As a general rule according to the invention, the proportion of the one or more (meth)acrylate components in the sizing composition is between 15 and 60% by weight. Preferably, the (meth)acrylic polyfunctional component(s) represent at least 50% of this (these) (meth)acrylic component(s). As (meth)acrylic polyfunctional component (s), at least one component having at least three reactive functional groups chosen from acrylic and methacrylic functional groups is preferably used.

Particularly advantageously, at least one component having four reactive functional groups chosen from acrylic and methacrylic functional groups (tetrafunctional components) and/or a component having at least six reactive functional groups chosen from acrylic and methacrylic functional groups (hexafunctional components) is chosen.

As nonlimiting examples, the primary and/or secondary amine component may be isophoronediamine, methanediamine, N-aminoethyl piperazine, para-phenylenedianiline or meta-phenylenedianiline, oxydianiline, diethyltoluenediamine, 4,4'-diaminodiphenylmethane, a secondary amine containing an aliphatic chain, diisopentylamine, N-ethylmethylamine, 1-(2-hydroxyethyl)-2-imidazolidinone, 2,6-dimethyl-morpholine, 2-propylimidazole, 2,6-diaminopyridine, polyamidoamines, derivatives of polyethylene polyamines, polyoxyalkylene polyamines, especially polyoxyethylenepolyamines, polyoxypropylenepolyamines, poly(oxyethylene/oxypropylene) polyamines, poly (oxypropylene/oxybutylene) polyamines, such as 4,9-dioxa-1,2-dodecanediamine, N'-(3-amino-propyl)-N,N'-dimethyl-1,3-propane diamine, 2-butyl-2-ethyl-1,5-pentanediamine, hexamethylenediamine, meta-xylylenediamine, amino alcohols, amidoamines and mixtures of primary amine(s) and phenolic alcohol(s) (Mannich bases).

As a general rule according to the invention, the proportion of primary and/or secondary amine component(s) in the sizing composition is between 4 and 40%, preferably between 6 and 25%, by weight.

In most cases, it is between 6 and 20% of the sizing composition. Preferably, the base system comprises at least one primary and/or secondary amine polyfunctional component and better still at least one difunctional component, that is to say one having two reactive functional groups chosen from primary and/or secondary amine functional groups. Preferably too, the amine functional groups of the primary and/or secondary amine components are directly attached to an alkylene, cycloalkylene or arylalkylene radical.

In many cases, the (meth)acrylic component(s) and the primary and/or secondary amine component(s) are chosen in such a way that the ratio r of the number of (meth)acrylic reactive sites to the number of primary and/or secondary amine reactive sites present is between 0.15 and 3, in order to allow the sizing composition to cure sufficiently. In most cases, this ratio r is between 0.3 and 2.5 and preferably between 0.4 and 2.

The sizing composition according to the invention may include, in addition to the components of the base system, at least one specific catalyst which increases the rate of the curing reaction, more particularly when the curable components are not very reactive.

It is possible to use a catalyst chosen from tertiary amines, derivatives of tertiary amines and metal halides such as $AlCl_3$, $FeCl_3$, $InCl_3$, $BF_3$ and $CuCl_2$ or organometallic complexes such as Cu-ethylenediamine, Yb acetate and Yb triflate. The catalyst content in the sizing composition may be up to 8% by weight. In most cases, no catalyst is used.

In addition to the aforementioned components which essentially contribute to the structure of the cured size, and where appropriate the catalysts, the sizing composition may include one or more components (hereafter referred to as additives). These additives give the size particular properties and, when the composition is deposited in two steps, they may be provided by one or both of the compositions constituting the size.

The composition according to the invention may include, as additive, at least one coupling agent allowing the size to bond to the glass. The coupling agent may be a component of the base system, in which case it contributes to the curing reaction, or a component acting only as additive and not acting in the curing.

The proportion of coupling agent(s) is generally between 0 and 30% by weight, and in most cases greater than 5% by weight, of the sizing composition. Preferably it is between 10 and 25% of the composition.

The coupling agent is generally chosen from silanes such as gamma-glycidoxypropyltrimethoxysilane, gamma-acryloxypropyltrimethoxysilane, gamma-methacryloxypropyltrimethoxysilane, poly(oxyethylene/oxypropylene)-trimethoxysilane, gamma-aminopropyltriethoxysilane, vinyltrimethoxysilane, phenylaminopropyltrimethoxysilane, styrylaminoethylaminopropyltrimethoxysilane or tert-butylcarbamoylpropyltrimethoxysilane, siloxanes, titanates, zirconates and mixtures of these compounds. Preferably, silanes are chosen.

The composition may include, as additive, at least one textile processing aid acting essentially as lubricant, and in many cases this is necessary so that the composition has the functions of a size.

The proportion of textile processing aid is generally between 0 and 30% by weight of the composition, and preferably 10 to 25%.

The textile processing aid is generally chosen from among fatty esters such as decyl laurate, isopropyl palmitate, cetyl palmitate, isopropyl stearate, isobutyl stearate, ethylene glycol adipate or trimethylolpropane trioctanoate, alkyl phenol derivatives such as ethoxylated nonyl phenol, derivatives of glycols such as polyethylene glycols or polypropylene glycols of molecular mass less than 2000, mixtures based on mineral oils, and mixtures of these compounds.

The composition according to the invention may also include, as additive, at least one film-forming agent which acts only as a slip agent facilitating the fiberizing process, especially by preventing substantial friction between the filaments and the sizer when they are stretched at a high rate and/or when they are very fine. However, this agent is expensive and may furthermore cause a reduction in the mechanical properties of the strands.

The proportion of film-forming agent is generally less than or equal to 8%, preferably less than or equal to 5%, by weight of the composition.

The film-forming agent is generally chosen from among silicones and silicone derivatives such as silicone oils, siloxanes and polysiloxanes such as glycidyl(n) polydimethylsiloxane or alpha, omega-acryloxypolydimethyl siloxane, polyacrylate silicones and mixtures of these compounds.

The composition according to the invention may include, as additive, at least one agent adapted to the materials to be reinforced, for example a corrosion inhibitor such as gallic acid in the case of cementitious materials.

The composition according to the invention may be deposited on the glass filaments in one or more steps, for example under the conditions of the process described in FR-A-2 763 328. In this process, streams of molten glass, flowing out from orifices located at the base of one or more bushings, are drawn in the form of one or more sheets of continuous filaments, then the filaments are assembled into one or more strands which are collected on one or more moving supports. The size is deposited to by applying the filaments a first stable composition having a viscosity of between 20 and 500 cP and at least one second stable composition having a viscosity of between 20 and 500 cP, this being fed separately from the first composition.

The second composition may be deposited on the filaments at the earliest while the first composition is being deposited or on the strands at the latest while they are being collected on the supports. The difference in viscosity between the compositions is generally less than 250 cP.

The composition according to the invention is preferably applied in two steps, the first composition comprising the (meth)acrylic component(s) and optionally one or more additives, and the second composition comprising the primary and/or secondary amine component(s) and optionally one or more additives, in particular the curing catalyst or catalysts.

It is particularly advantageous to deposit the size in two steps. This allows better control of the curing reactions and consequently the size is of uniform quality over the entire length of the strands, ensuring high productivity with a reduced risk of strand breakage. In most cases, deposition does not require an external supply of heat.

The sized strands are generally collected in the form of packages wound onto rotating supports. Whatever the state of cure of the size and the crossing angle, even when the latter is low (less than 1.5°), it is easy to unwind the strands from the packages and handle them. The straight-sided packages retain their dimensional characteristics and are undeformed.

The strands may also be collected on receiving supports moving translationally. They may in particular be thrown, by a device which also serves to draw them, toward the collecting surface which moves transversely to the direction in which the strands are thrown, for the purpose of obtaining a sheet of entangled continuous strands or "mat". The strands may also be chopped before they are collected, by a device also serving to draw them.

The strands obtained according to the invention may thus be in various forms after collection, for example in the form of bobbins of continuous strands (cakes, rovings, cops, etc.), of chopped strands, braids, tapes and mats or meshes. The glass filaments constituting these strands have a diameter which may vary greatly, usually from 5 to 30 $\mu$m. They may consist of any glass whatsoever, the most common in the field of reinforcing yarns being E glass and AR glass.

The strands obtained according to the invention may advantageously be used to reinforce various materials for the purpose of obtaining composite parts having high mechanical properties. The composites are obtained by combining at least glass strands according to the invention with at least one organic and/or inorganic material, the glass content generally varying from 2 to 5% by weight (cementitious matrix) and from 30 to 75%, preferably 40 to 70%, by weight (organic matrix). The preferred composites comprise glass strands, predominantly (more than 50% by weight) consisting of the strands according to the invention, and an organic material, such as a polyester, epoxy or phenolic resin or one of the styrene-butadiene (SBR) type. Advantageously, the resin is a polyester or epoxy resin.

The examples which follow allow the invention to be illustrated without however limiting it.

In these examples, the following analytical methods were used to measure the physical and mechanical properties of the glass strands coated with the sizing composition according to the invention and of the composites containing said strands.

Glass strands
- the abrasion resistance was measured by weighing the amount of fuzz formed after the strand passes over a series of eight ceramic cylindrical 90° turn rolls. It is expressed in mg per 1 kg of strand tested;
- the stiffness or rigidity was measured under the conditions defined by the ISO 3375 standard on 10 test pieces before and after undergoing the above-mentioned abrasion resistance test. The stiffness is expressed in mm and denoted as x(y), x and y representing the value measured before and the value measured after the strand passes over the turn rolls, respectively. The value y allows pre-assessment of the ability of the strand to be impregnated by a material, more particularly an organic material of the polymer type. In general, a sized glass strand whose y value is less than 100 mm and preferably close to 60 mm (the lowest value that can be obtained) is satisfactory for applications requiring good impregnation by the matrix. A strand having an x value of greater than or equal to 120 and a y value of greater than or equal to 100 is suitable for a usage requiring high integrity of the strand;
- the loss on ignition was measured according to the ISO 1887 standard. It is expressed in %;
- the tenacity was determined by measuring the tensile strength under the conditions in the ISO 3341 standard. It is expressed in cN/tex.

Composites
- the flexural strength and the flexural modulus were measured under the conditions defined by the ISO 178 standard, before and after aging by immersion in water at 100° C. for 24 hours. They are expressed in MPa, the standard deviation a being calculated over 8 to 10 test pieces;
- the shear strength was measured under the conditions defined by the ISO 4585 standard, before and after aging by immersion in water at 100° C. for 24 hours (examples 1, 4, 6, 9, 12, 14) or 72 hours (examples 2–3, 5, 7–8, 10–11, 13, 15). It is expressed in MPa, the standard deviation a being calculated over 8 to 10 test pieces.

EXAMPLE 1

Filaments 13.6 $\mu$m in diameter obtained by drawing streams of molten E glass, flowing from a bushing (800 orifices), were coated with the following first composition A and then with the following second composition B (in percentages by weight):

| Composition A | |
|---|---|
| polyester tetraacrylate of molecular mass = 1000[1] | 18 |
| aromatic polyurethane hexaacrylate of molecular mass = 1000[2] | 18 |
| gamma-methacryloxypropyltrimethoxysilane[3] | 11 |
| gamma-glycidoxypropyltrimethoxysilane[4] | 10 |
| 4-octylphenyl ethyl ether[5] | 5 |
| Composition B | |
| mixture of C,C,C-trimethylhexane-1,6-diamine, of xylylenediamine and of para-tert-butylphenol[6] | 10 |
| trimethylolpropane trioctanoate[7] | 15 |
| ethoxylated (4EO) lauric alcohol[8] | 13 |

The compositions A and B had a viscosity, measured on a SOFRASER MIVI 4000 apparatus sold by SOFRASER, of $135.4 \times 10^{-3}$ Pa.s (135.4 cP) and $52 \times 10^{-3}$ Pa.s (52 cP) at 25° C., respectively. The ratio r was 1.66.

The filaments were assembled as strands which were wound as rovings.

The amount of fuzz, the stiffness, the loss on ignition, the linear density and the tenacity were measured on the strands extracted from the rovings. The results of these measurements are given in table 1.

From the strands obtained, composite panels having parallel strands were produced in accordance with the ISO 9291 standard. The resin used was a resin consisting of 100 parts by weight of isophthalic polyester (reference: SYNOLIT 1717 sold by DSM) and 1.5 parts by weight of peroxide (reference: HTM 60 sold by Ciba-Geigy).

The values of the mechanical properties of these composites, in bending and in shear, before and after aging are given in table 2, for a glass content reduced to 100%.

EXAMPLE 2

From the strands obtained in example 1, composite panels were produced under the conditions of example 1 modified in that the resin was replaced with an epoxy resin consisting of 100 parts by weight of epoxy resin (reference LY 556 sold by Ciba-Geigy), 90 parts by weight of phthalic anhydride (reference: ARALDITE HY 917 sold by Ciba-Geigy) and 0.5 parts by weight of tertiary amine (reference: ARALDITE DY 070 sold by Ciba-Geigy).

The measurements of the mechanical properties of the panels obtained are given in table 2.

EXAMPLE 3

Filaments obtained under the conditions of example 1 were coated with the following first composition A and then with the following second composition B (in percentages by weight):

| Composition A | |
|---|---|
| polyester tetraacrylate of molecular mass = 1000[1] | 16 |
| aromatic polyurethane hexaacrylate of molecular mass = 1000[2] | 14 |
| gamma-methacryloxypropyltrimethoxysilane[3] | 11 |
| gamma-glycidoxypropyltrimethoxysilane[4] | 10 |
| 4-octylphenyl ethyl ether[5] | 5 |

-continued

| Composition B | |
|---|---|
| 4-octylphenyl ethyl ether[5] | 5 |
| mixture of C,C,C-trimethylhexane-1,6-diamine, of xylylenediamine and of para-tert-butylphenol[6] | 14 |
| trimethylolpropane trioctanoate[7] | 10 |
| ethoxylated (4EO) lauric alcohol[8] | 5 |
| alkoxylated aromatic derivative[9] | 10 |

The compositions A and B had a viscosity of $78.4 \times 10^{-3}$ Pa.s (78.4 cP) and $216 \times 10^{-3}$ Pa.s (216 cP) at 25° C., respectively, the ratio r being 1.02.

The filaments were assembled as strands which were wound as rovings.

The amount of fuzz, the stiffness, the loss on ignition, the linear density and the tenacity were measured on the strands extracted from the rovings. The results of these measurements are given in table 1

Parallel-strand composite panels were produced from the strands obtained, under the conditions of example 2.

The measurements of the mechanical properties of the panels obtained are given in table 2.

EXAMPLE 4

Filaments under the conditions of example 1 were coated with the following first composition A and then with the following second composition B (in percentages by weight):

| Composition A | |
|---|---|
| polyester tetraacrylate of molecular mass = 1000[1] | 20 |
| aromatic polyurethane hexaacrylate of molecular mass = 1000[2] | 10 |
| gamma-methacryloxypropyltrimethoxysilane[3] | 11 |
| gamma-glycidoxypropyltrimethoxysilane[4] | 10 |
| 4-octylphenyl ethyl ether[5] | 5 |
| Composition B | |
| mixture of C, C, C-trimethylhexane-1,6-diamine, of xylylenediamine and of para-tert-butylphenol[6] | 10 |
| trimethylolpropane trioctanoate[7] | 12 |
| ethoxylated (4EO) lauric alcohol[8] | 10 |
| alkoxylated aromatic derivative[9] | 8 |
| $C_{16}$ alkylimidazoline[10] | 4 |

The compositions A and B had a viscosity of $77.6 \times 10^{-3}$ Pa.s (77.6 cP) and $161 \times 10^{-3}$ Pa.s (161 cP) at 25° C., respectively, the ratio r being 1.36.

The filaments were assembled as strands which were wound as rovings.

The amount of fuzz, the stiffness, the loss on ignition, the linear density and the tenacity were measured on the strands extracted from the rovings. The results of these measurements are given in table 1.

Composite panels were produced from the strands thus obtained, under the conditions described in example 1.

The measurements of the mechanical properties of the panels obtained are given in table 2.

EXAMPLE 5

Composite panels were produced from the strands obtained in example 4, under the conditions described in example 2.

The measurements of the mechanical properties of the panels obtained are given in table 2.

EXAMPLE 6

Filaments obtained under the conditions of example 1 were coated with the following first composition A and then with the following second composition B (in percentages by weight):

| Composition A | |
|---|---|
| polyester tetraacrylate of molecular mass = 1000[1] | 22 |
| aromatic polyurethane hexaacrylate of molecular mass = 1000[2] | 8 |
| gamma-methacryloxypropyltrimethoxysilane[3] | 11 |
| gamma-glycidoxypropyltrimethoxysilane[4] | 10 |
| 4-octylphenyl ethyl ether[5] | 5 |
| Composition B | |
| mixture of C,C,C-trimethylhexane-1,6-diamine, of xylylenediamine and of para-tert-butylphenol[6] | 10 |
| trimethylolpropane trioctanoate[7] | 12 |
| ethoxylated (4EO) lauric alcohol[8] | 10 |
| alkoxylated aromatic derivative[9] | 12 |

The compositions A and B had a viscosity of $72.8 \times 10^{-3}$ Pa.s (72.8 cP) and $169.3 \times 10^{-3}$ Pa.s (169.3 cP) at 25° C., respectively, the ratio r being 1.33.

The filaments were assembled as strands which were wound as rovings.

The amount of fuzz, the stiffness, the loss on ignition, the linear density and the tenacity were measured on the strands extracted from the rovings. The results of these measurements are given in table 1.

Composite panels were produced from the strands thus obtained, under the conditions described in example 1.

The measurements of the mechanical properties of the panels obtained are given in table 2.

EXAMPLE 7

Composite panels were produced from the strands obtained in example 6, under the conditions described in example 2.

The measurements of the mechanical properties of the panels obtained are given in table 2.

EXAMPLE 8

Filaments obtained under the conditions of example 1 were coated with the following first composition A and then with the following second composition B (in percentages by weight):

| Composition A | |
|---|---|
| polyester tetraacrylate of molecular mass = 1000[1] | 18 |
| aromatic polyurethane hexaacrylate of molecular mass = 1000[2] | 18 |
| gamma-methacryloxypropyltrimethoxysilane[3] | 11 |
| gamma-glycidoxypropyltrimethoxysilane[4] | 10 |
| 4-octylphenyl ethyl ether[5] | 5 |
| Composition B | |
| C,C,C-trimethylhexane-1,6-diamine | 4 |
| 4,9-dioxa-1,12-dodecanediamine | 6 |
| trimethylolpropane trioctanoate[7] | 15 |
| ethoxylated (4EO) lauric alcohol[8] | 13 |

The compositions A and B had a viscosity of $127 \times 10^{-3}$ Pa.s (127 cP) and $27 \times 10^{-3}$ Pa.s (27 cP) at 25° C., respectively, the ratio r being 1.10.

The filaments were assembled as strands which were wound as rovings.

The amount of fuzz, the stiffness, the loss on ignition, the linear density and the tenacity were measured on the strands extracted from the rovings. The results of these measurements are given in table 1.

Composite panels were produced from the strands thus obtained, under the conditions described in example 2.

The measurements of the mechanical properties of the panels obtained are given in table 3.

EXAMPLE 9

Filaments obtained under the conditions of example 1 were coated with the following first composition A and then with the following second composition B (in percentages by weight):

| Composition A | |
|---|---|
| polyester tetraacrylate of molecular mass = 1000[1] | 18 |
| aromatic polyurethane hexaacrylate of molecular mass = 1000[2] | 18 |
| gamma-methacryloxypropyltrimethoxysilane[3] | 11 |
| gamma-glycidoxypropyltrimethoxysilane[4] | 10 |
| 4-octylphenyl ethyl ether[5] | 5 |
| Composition B | |
| C,C,C-trimethylhexane-1,6-diamine | 10 |
| trimethylolpropane trioctanoate[7] | 15 |
| ethoxylated (4EO) lauric alcohol[8] | 13 |

The compositions A and B had a viscosity of $127 \times 10^{-3}$ Pa.s (127 cP) and $23.8 \times 10^{-3}$ Pa.s (23.8 cP) at 25° C., respectively, the ratio r being 0.88.

The filaments were assembled as strands which were wound as rovings.

The amount of fuzz, the stiffness, the loss on ignition, the linear density and the tenacity were measured on the strands extracted from the rovings. The results of these measurements are given in table 1.

Composite panels were produced from the strands thus obtained, under the conditions described in example 1.

The measurements of the mechanical properties of the panels obtained are given in table 3.

EXAMPLE 10

Composite panels were produced from the strands thus obtained in example 9, under the conditions described in example 2.

The measurements of the mechanical properties of the panels obtained are given in table 3.

EXAMPLE 11

Filaments obtained under the conditions of example 1 were coated with the following first composition A and then with the following second composition B (in percentages by weight):

| Composition A | |
|---|---|
| polyester tetraacrylate of molecular mass = 1000[1] | 18 |
| aromatic polyurethane hexaacrylate of molecular mass = 1000[2] | 18 |

-continued

| | |
|---|---|
| gamma-methacryloxypropyltrimethoxysilane[3] | 11 |
| gamma-glycidoxypropyltrimethoxysilane[4] | 10 |
| 4-octylphenyl ethyl ether[5] | 5 |
| Composition B | |
| 4,9-dioxa-1,12-dodecanediamine | 10 |
| trimethylolpropane trioctanoate[7] | 15 |
| ethoxylated (4EO) lauric alcohol[8] | 13 |

The compositions A and B had a viscosity of $127 \times 10^{-3}$ Pa.s (127 cP) and $25.3 \times 10^{-3}$ Pa.s (25.3 cP) at 25° C., respectively, the ratio r being 0.76.

The filaments were assembled as strands which were wound as rovings.

The amount of fuzz, the stiffness, the loss on ignition, the linear density and the tenacity were measured on the strands extracted from the rovings. The results of these measurements are given in table 1.

Composite panels were produced from the strands thus obtained, under the conditions described in example 2.

The measurements of the mechanical properties of the panels obtained are given in table 3.

EXAMPLE 12

Filaments obtained under the conditions of example 1 were coated with the following first composition A and then with the following second composition B (in percentages by weight):

| | |
|---|---|
| Composition A | |
| polyester tetraacrylate of molecular mass = 1000[1] | 18 |
| aromatic polyurethane hexaacrylate of molecular mass = 1000[2] | 18 |
| gamma-methacryloxypropyltrimethoxysilane[3] | 11 |
| gamma-glycidoxypropyltrimethoxysilane[4] | 10 |
| 4-octylphenyl ethyl ether[5] | 5 |
| Composition B | |
| C,C,C-trimethylhexane-1,6-diamine | 3 |
| 4,9-dioxa-1,12-dodecanediamine | 4 |
| trimethylolpropane trioctanoate[7] | 17 |
| ethoxylated (4EO) lauric alcohol[8] | 14 |

The compositions A and B had a viscosity of $127 \times 10^{-3}$ Pa.s (127 cP) and $30 \times 10^{-3}$ Pa.s (30 cP) at 25° C., respectively, the ratio r being 1.15.

The filaments were assembled as strands which were wound as rovings.

The amount of fuzz, the stiffness, the loss on ignition, the linear density and the tenacity were measured on the strands extracted from the rovings. The results of these measurements are given in table 1.

Composite panels were produced from the strands thus obtained, under the conditions described in example 1.

The measurements of the mechanical properties of the panels obtained are given in table 3.

EXAMPLE 13

Composite panels were produced from the strands obtained in example 12, under the conditions of example 2.

The measurements of the mechanical properties of the panels are given in table 3.

EXAMPLE 14

Filaments of obtained under the conditions of example 1 were coated with the following first composition A and then with the following second composition B (in percentages by weight):

| | |
|---|---|
| Composition A | |
| polyester tetraacrylate of molecular mass = 1000[1] | 14 |
| aromatic polyurethane hexaacrylate of molecular mass = 1000[2] | 14 |
| bisphenol F diglycidyl ether[11] | 8 |
| gamma-methacryloxypropyltrimethoxysilane[3] | 11 |
| gamma-glycidoxypropyltrimethoxysilane[4] | 10 |
| 4-octylphenyl ethyl ether[5] | 5 |
| Composition B | |
| mixture of C,C,C-trimethylhexane-1,6-diamine, of xylylenediamine and of para-tert-butylphenol[6] | 10 |
| isopropyl palmitate | 15 |
| ethoxylated (4EO) lauric alcohol[8] | 13 |

The compositions A and B had a viscosity of $110 \times 10^{-3}$ Pa.s (110 cP) and $48.8 \times 10^{-3}$ Pa.s (48.8 cP) at 25° C., respectively, the ratio r being 1.36.

The filaments were assembled as strands which were wound as rovings.

The amount of fuzz, the stiffness, the loss on ignition, the linear density and the tenacity were measured on the strands extracted from the rovings. The results of these measurements are given in table 1.

Composite panels were produced from the strands thus obtained, under the conditions described in example 1.

The measurements of the mechanical properties of the panels obtained are given in table 3.

EXAMPLE 15

Composite panels were produced from the strands obtained in example 14, under the conditions described in example 2.

The measurements of the mechanical properties of the panels obtained are given in table 3.

EXAMPLE 16

Filaments obtained under the conditions of example 1 were coated with the following first composition A and then with the following second composition B (in percentages by weight):

| | |
|---|---|
| Composition A | |
| polyester tetraacrylate of molecular mass = 1000[1] | 20 |
| aromatic polyurethane hexaacrylate of molecular mass = 1000[2] | 10 |
| gamma-methacryloxypropyltrimethoxysilane[3] | 11 |
| gamma-glycidoxypropyltrimethoxysilane[4] | 10 |
| 4-octylphenyl ethyl ether[5] | 5 |
| Composition B | |
| mixture of C,C,C-trimethylhexane-1,6-diamine, of xylylenediamine and of para-tert-butylphenol[6] | 10 |
| isopropyl palmitate | 12 |
| ethoxylated (4EO) lauric alcohol[8] | 10 |
| alkoxylated aromatic derivative[9] | 8 |
| $C_{16}$ alkylimidazoline[10] | 4 |

The compositions A and B had a viscosity of $73.4 \times 10^{-3}$ Pa.s (73.4 cP) and $75.2 \times 10^{-3}$ Pa.s (75.2 cP) at 22° C., respectively, the ratio r being 1.36.

The filaments were assembled as strands which were wound as rovings.

The amount of fuzz, the stiffness, the loss on ignition, the linear density and the tenacity were measured on the strands extracted from the rovings. The results of these measurements are given in table 1.

Composite panels were produced from the strands thus obtained, under the conditions described in example 1.

The measurements of the mechanical properties of the panels obtained are given in table 4.

EXAMPLE 17

Composite panels were produced from the strands obtained in example 16, under the conditions described in example 2.

The measurements of the mechanical properties of the panels obtained are given in table 4.

EXAMPLE 18

Filaments obtained under the conditions of example 1 were coated with the following first composition A and then with the following second composition B (in percentages by weight):

| Composition A | |
|---|---|
| polyester tetraacrylate of molecular mass = 1000[1] | 18 |
| aromatic polyurethane hexaacrylate of molecular mass = 1000[2] | 11 |
| bisphenol F diglycidyl ether[11] | 8 |
| gamma-methacryloxypropyltrimethoxysilane[3] | 10 |
| gamma-glycidoxypropyltrimethoxysilane[4] | 10 |
| polyethylene glycol 300 isostearate[12] | 5 |
| Composition B | |
| mixture of C,C,C-trimethylhexane-1,6-diamine, of xylylenediamine and of para-tert-butylphenol[6] | 10 |
| isopropyl palmitate | 10 |
| ethoxylated (4EO) lauric alcohol[8] | 10 |
| alkoxylated aromatic derivative[9] | 8 |

The compositions A and B had a viscosity of $93.4 \times 10^{-3}$ Pa.s (93.4 cP) and $73.2 \times 10^{-3}$ Pa.s (73.2 cP) at 22° C., respectively, the ratio r being 1.35.

The filaments were assembled as strands which were wound as rovings.

The amount of fuzz, the stiffness, the loss on ignition, the linear density and the tenacity were measured on the strands extracted from the rovings. The results of these measurements are given in table 1.

Composite panels were produced from the strands thus obtained, under the conditions described in example 1.

The measurements of the mechanical properties of the panels obtained are given in table 4.

EXAMPLE 19

Composite panels were produced from the strands obtained in example 18, under the conditions of example 2.

The measurements of the mechanical properties of the panels obtained are given in table 4.

EXAMPLE 20

Filaments obtained under the conditions of example 1 were coated with the following first composition A and with the following second composition B (in percentages by weight):

| Composition A | |
|---|---|
| aliphatic polyurethane hexaacrylate of molecular mass = 800[14] | 10 |
| polyether tetraacrylate of molecular mass greater than 1000[15] | 22 |
| bisphenol F diglycidyl ether[11] | 8 |
| gamma-methacryloxypropyltrimethoxysilane[3] | 10 |
| gamma-glycidoxypropyltrimethoxysilane[4] | 8 |
| polyethylene glycol 300 isostearate[12] | 4 |
| Composition B | |
| mixture of C,C,C-trimethylhexane-1,6-diamine, of xylylenediamine and of para-tert-butylphenol[6] | 9 |
| isopropyl palmitate | 12 |
| ethoxylated (4EO) lauric alcohol[8] | 10 |
| alkoxylated aromatic derivative[9] | 7 |

The compositions A and B had a viscosity of $162 \times 10^{-3}$ Pa.s (162 cP) and $66 \times 10^{-3}$ Pa.s (66 cP) at 22° C., respectively, the ratio r being 1.67.

The filaments were assembled as strands which were wound as rovings.

The amount of fuzz, the stiffness, the loss on ignition, the linear density and the tenacity were measured on the strands extracted from the rovings. The results of these measurements are given in table 1.

Composite panels were produced from the strands thus obtained, under the conditions described in example 1.

The measurements of the mechanical properties of the panels obtained are given in table 4.

EXAMPLE 21

Composite panels were produced from the strands obtained in example 20, under the conditions of example 2.

The measurements of the mechanical properties of the panels obtained are given in table 4.

EXAMPLE 22

Filaments obtained under the conditions of example 1 were coated with the following first composition A and with the following second composition B (in percentages by weight):

| Composition A | |
|---|---|
| aliphatic polyurethane hexaacrylate of molecular mass = 800[14] | 12 |
| polyether tetraacrylate of molecular mass greater than 1000[15] | 20 |
| gamma-methacryloxypropyltrimethoxysilane[3] | 10 |
| gamma-glycidoxypropyltrimethoxysilane[4] | 10 |
| polyethylene glycol 300 isostearate[12] | 5 |
| polyethylene glycol 300[15] | 5 |
| Composition B | |
| trimethl-1,6-hexanediamine | 7 |
| isopropyl palmitate | 12 |
| ethoxylated (4EO) lauric alcohol[8] | 10 |
| alkoxylated aromatic derivative[9] | 9 |

The compositions A and B had a viscosity of $110.4 \times 10^{-3}$ Pa.s (110.4 cP) and $39 \times 10^{-3}$ Pa.s (39 cP) at 22° C., respectively, the ratio r being 1.19.

The filaments were assembled as strands which were wound as rovings.

The amount of fuzz, the stiffness, the loss on ignition, the linear density and the tenacity were measured on the strands extracted from the rovings. The results of these measurements are given in table 1.

Composite panels were produced from the strands thus obtained, under the conditions described in example 1.

The measurements of the mechanical properties of the panels obtained are given in table 4.

EXAMPLE 23

Composite panels were produced from the strands obtained in example 22, under the conditions of example 2.

The measurements of the mechanical properties of the panels obtained are given in table 4.

In the above examples, it should be pointed out that the strands obtained according to the invention can be easily handled. They have a high tenacity for a relatively low loss on ignition. Moreover, the strands according to the invention exhibit good abrasion resistance measured by the small amount of fuzz recovered after passing over the turn rolls. It should be noted that the strand obtained according to examples 4, 6 and 20 possesses good weavability and impregnability (low integrity after undergoing the abrasion test) and that the strand of examples 8, 9 and 11 exhibits good integrity before and after undergoing the abrasion test.

Moreover; the strands according to the invention allow effective reinforcement of organic materials, especially those based on a polyester or epoxy resin.

The composites incorporating said strands have a high flexural modulus, in particular for polyester resins (of around 40 000 MPa), this high modulus being maintained after aging. The shear strength is also high, up to 90 MPa, in the composites based on polyester resin, such a value being difficult to attain with glass strands coated with an aqueous size. This strength value remains good after aging (less than 30% drop).

(1) Sold under the reference "EBECRYL 810" by Union Chimique Belge
(2) Sold under the reference "EBECRYL 220" by Union Chimique Belge
(3) Sold under the reference "SILQUEST Si A 174" by Witco OSI
(4) Sold under the reference "SILQUEST Si A 187" by Witco OSI
(5) Sold under the reference "IGEPAL CO630" by Rhodia
(6) Sold under the reference "ANCAMINE 2089 M" by Air Products
(7) Sold under the reference "TMP ESTER" by Lamberti
(8) Sold under the reference "SIMULSOL P4" by Seppic
(9) Sold under the reference "SIMULSOL BPPE" by Seppic
(10) Sold under the reference "NEOXIL AO 83634" by DSM
(11) Sold under the reference "ARADITE GY 285" by Ciba-Geigy
(12) Sold under the reference "2018 LDM" by Seppic
(13) Sold under the reference "EBECRYL 5129" by Union Chimique Belge
(14) Sold under the reference "IRR 443" by Union Chimique Belge
(15) Sold under the reference "POLYGLYCOL PEG 300" by Clariant

TABLE 1

|  | Ex. 1 | Ex. 3 | Ex. 4 | Ex. 6 | Ex. 8 | Ex. 9 | Ex. 11 | Ex. 12 | Ex. 14 | Ex. 16 | Ex. 18 | Ex. 20 | Ex. 22 |
|---|---|---|---|---|---|---|---|---|---|---|---|---|---|
| Fuzz (mg) | 1 | 6 | 5 | 7 | 0.7 | 0.7 | 2.3 | 8 | 0 | 3.7 | 2 | 0.7 | 1.3 |
| Stiffness (mm) | 165 (62) | 147 (62) | 142 (60) | 133 (60) | 193 (75) | 182 (83) | 172 (72) | 180 (65) | 165 (63) | 162 (60) | 160 (65) | 142 (60) | 152 (60) |
| Loss on ignition (%) | 0.55 | 0.53 | 0.53 | 0.51 | 0.61 | 0.55 | 0.54 | 0.52 | 0.48 | 0.53 | 0.47 | 0.51 | 0.49 |
| Linear density (tex) | 302 | 312 | 301 | 306 | 309 | 302 | 300 | 306 | 297 | 284 | 295 | 301 | 298 |
| Tenacity (g/tex) | — | 47.8 | 48.7 | — | 45.6 | 50.7 | 44.7 | 45.8 | 43.8 | 38.2 | 38.7 | 39.0 | 24.3 |
| σ | — | (4.1) | (1.5) | — | (2.0) | (2.0) | (2.2) | (1.5) | (2.0) | (4.8) | (5.7) | (3.4) | (6.6) |

TABLE 2

|  | Ex. 1 | Ex. 2 | Ex. 3 | Ex. 4 | Ex. 5 | Ex. 6 | Ex. 7 |
|---|---|---|---|---|---|---|---|
| Glass content (% by weight) | 68.02 | 66.11 | 62.86 | 65.17 | 63.90 | 69.01 | 63.19 |
| Resin | polyester | epoxy | epoxy | polyester | epoxy | polyester | epoxy |
| BENDING Strength for 100% glass (MPa) |  |  |  |  |  |  |  |
| before aging | 3111.1 | 2709.1 | 2718.2 | 3143.7 | 2752.9 | 3011.9 | 2747.7 |
| σ | (90.4) | (131.3) | (124.9) | (76.7) | (121.6) | (130.9) | (184.8) |
| after aging | 2389.6 | 2380.0 | 2239.3 | 2137.1 | 2407.2 | 2303.9 | 2513.3 |
| σ | (48.0) | (91.7) | (83.9) | (71) | (41.7) | (74.6) | (202.1) |

TABLE 2-continued

|  | Ex. 1 | Ex. 2 | Ex. 3 | Ex. 4 | Ex. 5 | Ex. 6 | Ex. 7 |
|---|---|---|---|---|---|---|---|
| Modulus (MPa) | | | | | | | |
| before aging | 40439 | 38531 | 35820 | 38175 | 35978 | 39806 | 36184 |
| σ | (561) | (285) | (845) | (1433) | (524) | (818) | (1901) |
| after aging | 40316 | 38929 | 36093 | 37273 | 36795 | 40790 | 35928 |
| σ | (1006) | (349) | (910) | (847) | (613) | (1076) | (2661) |
| SHEAR Strength (MPa) | | | | | | | |
| before aging | 89.4 | 81.7 | 80.0 | 86.7 | 82.6 | 90.2 | 79.9 |
| σ | (0.6) | (0.7) | (1.2) | (0.9) | (0.9) | (0.9) | (1.0) |
| after aging | 64.9 | 48.5 | 48.6 | 67.2 | 70.3 | 68.9 | 65.5 |
| σ | (0.7) | (0.8) | (0.7) | (0.8) | 0.5 | (1.1) | (2.6) |

TABLE 3

|  | Ex. 8 | Ex. 9 | Ex. 10 | Ex. 11 | Ex. 12 | Ex. 13 | Ex. 14 | Ex. 15 |
|---|---|---|---|---|---|---|---|---|
| Glass content (% by weight) | 63.68 | 67.04 | 61.02 | 63.45 | 66.13 | 63.69 | 66.99 | 64.75 |
| Resin | epoxy | polyester | epoxy | epoxy | polyester | epoxy | polyester | epoxy |
| BENDING Strength for 100% glass (MPa) | | | | | | | | |
| before aging | 2682.4 | 3187.5 | 2755.8 | 2789.9 | 3155.3 | 2751.7 | 3137.1 | 2662.2 |
| σ | (103.6) | (129.4) | (73.4) | (75.2) | (91.3) | (89.6) | (146.8) | (197.6) |
| after aging | 1916.2 | 2254.1 | 2357.7 | 1693.0 | 2373.0 | 2335.4 | 2260.0 | 2562.0 |
| σ | (135.6) | (46.2) | (44.2) | (53.7) | (72.5) | (100.2) | (64.3) | (75.4) |
| Modulus (MPa) | | | | | | | | |
| before aging | 35604 | 38716 | 33378 | 35112 | 37748 | 35207 | 40221.0 | 35961 |
| σ | (1777) | (599) | (502) | (487) | (979) | (345) | (866) | (828) |
| after aging | 34499 | 37718 | 32917 | 33967 | 36928 | 34717 | 38919.0 | 36178 |
| σ | (3080) | (487) | (782) | (733) | (729) | (459) | (699) | (363) |
| SHEAR Strength (MPa) | | | | | | | | |
| before aging | 79.5 | 84.8 | 79.4 | 77.8 | 84.1 | 81.4 | 89.3 | 80.2 |
| σ | (0.6) | (1.3) | (0.2) | (0.2) | (1.4) | (0.6) | (0.5) | (1.9) |
| after aging | 36.1 | 64.1 | 58.9 | 29.8 | 59.9 | 55.6 | 67.0 | 72.7 |
| σ | (1.2) | (1.10) | (0.6) | (1.0) | (0.80) | (0.7) | (1.0) | (0.8) |

TABLE 4

|  | Ex. 16 | Ex. 17 | Ex. 18 | Ex. 19 | Ex. 20 | Ex. 21 | Ex. 22 | Ex. 23 |
|---|---|---|---|---|---|---|---|---|
| Glass content (% by weight) | 65.00 | 62.56 | 66.3 | 64.24 | | | 67.8 | 64.77 |
| Resin | polyester | epoxy | polyester | epoxy | polyester | epoxy | polyester | epoxy |
| BENDING Strength for 100% glass (MPa) | | | | | | | | |
| before aging | 3150.1 | 2817.0 | 3221.9 | 2798.8 | 3074.3 | 2827.1 | 3218.4 | 2824.8 |
| σ | (113.2) | (140.0) | (161) | (133.5) | (178.4) | (112.2) | (129.6) | (70.8) |
| after aging | 2054.0 | 2146.0 | 2045.9 | 2646.0 | 2286.5 | 2603.0 | 2129.0 | 2557.7 |
| σ | (102.3) | (43.8) | (43.4) | (97.7) | (77.8) | (52.6) | (104.9) | (111.1) |
| Modulus (MPa) | | | | | | | | |
| before aging | 37479 | 35584 | 39381 | 37285 | 36545 | 36978 | 40457 | 37778 |
| σ | (506) | (889) | (1015) | (971) | (2644) | (476) | (735) | (477) |
| after aging | 35295 | 355.64 | 37529 | 37068 | 34811 | 36711 | 38262 | 37622 |
| σ | (311) | (540) | (759) | (851) | (1117) | (481) | (913) | (443) |
| SHEAR Strength (MPa) | | | | | | | | |
| before aging | 85.0 | 88.5 | 84.8 | 83.3 | 86.9 | 83.4 | 86.7 | 83.2 |
| σ | (2.1) | (1.4) | (1.3) | (0.7) | (1.0) | (1.4) | (1.10) | (0.40) |
| after aging | 67.6 | 69.2 | 64.6 | 70.9 | 67.7 | 71.1 | 65.0 | 70.0 |
| σ | (0.9) | (0.60) | (1.7) | (1.10) | (0.70) | (0.4) | (1.3) | (0.80) |

What is claimed is:

1. A glass strand coated with a sizing composition, comprising:
   a solution having a solvent content of less than 5% by weight;
   said solution comprising at least 45% by weight of components capable of curing,
   wherein at least 40% of said components capable of curing have a molecular mass of between 750 and 5000; and
   wherein said components capable of curing comprise
      at least one mixture comprising
         one or more components having at least one acrylic reactive functional group and/or methacrylic reactive functional group, and
         one or more components having at least one primary amine reactive functional group and/or secondary amine reactive functional group.

2. The glass strand as claimed in claim 1, wherein at least 40% of the components capable of curing have at least two reactive functional groups selected from the group consisting of acrylic functional groups, methacrylic functional groups, primary amine functional groups, secondary amine functional groups and mixtures thereof.

3. The glass strand as claimed in claim 1, wherein more than 50% of the components capable of curing have at least one reactive functional group selected form the group consisting of acrylic functional groups, methacrylic functional groups, primary amine functional groups and mixtures thereof.

4. The glass strand as claimed in claim 1, wherein the mixture comprises at least one component having at least two acrylic reactive functional groups and/or methacrylic reactive functional groups and having a molecular mass of between 750 and 5000.

5. The glass strand as claimed in claim 1, wherein a content of component(s) having at least one acrylic functional group and/or at least one methacrylic reactive functional group is between 15 and 60% by weight of the sizing composition.

6. The glass strand as claimed in claim 1, comprising at least 50% by weight of the components capable of curing having at least two reactive functional groups of acrylic functional groups, methacrylic functional groups and mixtures thereof.

7. The glass strand as claimed in claim 1, wherein a proportion of component(s) having at least one primary amine reactive functional group and/or secondary amine reactive functional group is between 4 and 40% by weight of the sizing composition.

8. The glass strand as claimed in claim 1, wherein a ratio r of the number of (meth)acrylic reactive sites to the number of primary reactive sites and/or secondary amine reactive sites is between 0.15 and 3.

9. The glass strand as claimed in claim 1, wherein at least 20% by weight of the components capable of curing have
   i) at least two reactive functional groups selected from the group consisting of acrylic functional groups, and methacrylic functional groups and mixtures thereof, and have
   ii) a molecular mass of between 750 and 5000.

10. The glass strand as claimed in claim 1, wherein the sizing composition comprises up to 8% by weight of at least one catalyst.

11. The glass strand as claimed in claim 1, wherein the composition comprises at least one coupling agent in a proportion of between 0 and 30% by weight.

12. The glass strand as claimed in claim 1, wherein the composition includes comprises at least one textile processing aid in a proportion of between 0 and 35%.

13. The glass strand as claimed in claim 1, wherein the composition comprises up to 8% by weight of at least one film-forming agent.

14. A sizing composition for glass strand, comprising:
   a solution having a solvent content of less than 5% by weight;
   said solution comprising at least 45% by weight of components capable of curing,
   wherein at least 40% of said components capable of curing have a molecular mass of between 750 and 5000; and
   wherein said components capable of curing comprise
      at least one mixture comprising
         one or more components having at least one acrylic reactive functional group and/or methacrylic reactive functional group, and
         one or more components having at least one primary amine reactive functional group and/or secondary amine reactive functional group.

15. The composition as claimed in claim 14, wherein at least 40% of the components capable of curing have at least two reactive functional groups selected from the group consisting of acrylic functional groups, methacrylic functional groups, primary amine functional groups, secondary amine functional groups and mixtures thereof.

16. A process for producing sized glass strands, comprising
   drawing a multiplicity of streams of molten glass, flowing out from a multiplicity of orifices located at the base of one or more bushings, in the form of one or more sheets of continuous filaments;
   assembling the filaments into one or more strands which are collected on a moving support;
   depositing, on the surface of the filaments while they are being drawn and before the filaments have been assembled into strands, at least some of the sizing composition as claimed in claim 14, the strand or strands being coated with the sizing composition at the latest during collection of the strand or strands.

17. The process as claimed in claim 16, wherein the composition is deposited in one step on the surface of the filaments while they are being drawn and before the filaments are assembled into strands.

18. The process as claimed in claim 16, wherein a first stable composition having a viscosity of between 20 and 500 cP is deposited on the surface of the filaments and at least one second stable composition, fed separately from the first, having a viscosity of between 20 and 500 cP is deposited on the surface of the filaments or of the strand or strands at the earliest while the first composition is being deposited and at the latest while the strand or strands are being collected, the difference in viscosity between the compositions deposited being less then 250 cP, the mixture of the compositions deposited forming a sizing composition being curable at room temperature and comprising
   a solution having a solvent content of less than 5% by weight;
   is said solution comprising at least 45% by weight of components capable of curing,
   wherein at least 40% of said components capable of curing have a molecular mass of between 750 and 5000; and wherein said components capable of curing comprise
at least one mixture comprising
one or more components having at least one acrylic reactive functional group and/or methacrylic reactive functional group, and
one or more components having at least one primary amine reactive functional group and/or secondary amine reactive functional group.

19. The process as claimed in claim 18, wherein the first composition comprises at least one component having at least one acrylic reactive functional group and/or methacrylic reactive functional group and in that the second composition comprises at least one component having at least one primary amine reactive functional group and/or secondary amine reactive functional group.

20. A composite, comprising:
at least one organic material and/or inorganic material and sized glass strands,
wherein all or some of the glass strands are sized glass strands as claimed in claim 1.

* * * * *